(12) United States Patent
Collins (10) Patent No.: US 7,572,091 B1
(45) Date of Patent: Aug. 11, 2009

(54) SYSTEM FOR LOADING/UNLOADING CONTAINERS

(75) Inventor: Virgil L. Collins, Guttenberg, IA (US)

(73) Assignee: M & D RP LLC, Iberia, OH (US)

( * ) Notice: Subject to any disclaimer, the term of this patent is extended or adjusted under 35 U.S.C. 154(b) by 0 days.

(21) Appl. No.: 11/906,123

(22) Filed: Sep. 27, 2007

Related U.S. Application Data (63) Continuation of application No. 10/767,594, filed on Jan. 28, 2004, now abandoned.

(51) Int. Cl.
*B60P 1/04* (2006.01)
*B62B 1/00* (2006.01)

(52) U.S. Cl. .................. 414/494; 414/498; 414/478

(58) Field of Classification Search .................. 414/546, 414/491, 494, 498, 421, 728, 477, 478, 500
See application file for complete search history.

(56) References Cited

U.S. PATENT DOCUMENTS

| | | | |
|---|---|---|---|
| 3,130,847 A | 4/1964 | Dempster et al. | |
| 3,272,546 A | 9/1966 | Cooley | |
| 3,485,400 A | 12/1969 | Pewthers | |
| 3,786,949 A | 1/1974 | Sutton | |
| 3,858,927 A | 1/1975 | Sutton | |
| 3,874,537 A | 4/1975 | Kou | |
| 3,964,625 A | 6/1976 | Wirz | |
| 4,153,169 A | 5/1979 | Cipkowski | |
| 4,204,793 A | 5/1980 | Lemaire | |
| 4,290,726 A * | 9/1981 | Sutela et al. | 414/421 |
| 4,350,469 A | 9/1982 | Corompt | |
| 4,645,405 A | 2/1987 | Cambiano | |
| 4,802,811 A | 2/1989 | Nijenhuis | |
| 4,915,567 A | 4/1990 | Ellingsen | |
| 4,986,719 A | 1/1991 | Galbreath | |
| 5,163,800 A | 11/1992 | Raisio | |
| 5,192,189 A | 3/1993 | Murata et al. | |
| 5,193,968 A | 3/1993 | Hicks | |
| 5,203,668 A | 4/1993 | Marmur | |
| 5,460,473 A | 10/1995 | LaMora et al. | |
| 5,601,393 A | 2/1997 | Waldschmitt | |
| 6,558,104 B1 | 5/2003 | Vlaanderen | |
| 7,377,592 B2 | 5/2008 | Kraenzle | |
| 2002/0146306 A1 | 10/2002 | Morrell | |
| 2004/0156701 A1 | 8/2004 | Scranton et al. | |

FOREIGN PATENT DOCUMENTS

| | | |
|---|---|---|
| CA | 2131356 | 9/1994 |
| EP | 0564 403 A1 | 10/1993 |

(Continued)

OTHER PUBLICATIONS

Waste Equipment Technology Association. "Recommended Practice." Subject: Roll-off Frame Rated Capacity, WASTEC Recommended Practice. (WRP Mar. 1996).

(Continued)

*Primary Examiner*—Gregory W Adams
(74) *Attorney, Agent, or Firm*—John A. Artz; Dickinson Wright PLLC (57) ABSTRACT

A container handling system for a wheeled transport vehicle is disclosed that is capable of loading and unloading large containers using both a hook lift and cable winch mechanisms.

2 Claims, 12 Drawing Sheets

FOREIGN PATENT DOCUMENTS

EP        0811 525 A1    12/1997

OTHER PUBLICATIONS

Photographs of hoist observed at Elliot Equipment in Lincoln Nebraska—Applicant learned of the existence of the hoist shown in the attached pictures. This hoist was observed at Elliot Equipment in Lincoln, Nebraska. Applicant used its best efforts to investigate the origin, date of manufacture and location of manufacture of the hoist. Applicant was unable to learn definitively the date and location of manufacture and was unable to determine if any such hoist designs were commercially used, offered or sold in the U.S. prior to Jan. 28, 2004. Applicant did determine that Elliot Equipment is a dealer for New Way Company and that Elliot received the hoist from New Way for use as a demonstration model. Applicant submits that the device is only cumulative of the prior art before the Examiner. Applicant believes that these photos may be material to the Examiner's consideration of the pending claims.

Holt Specialty Equipment, Inc., Eagleville, Tennessee, Aug. 1, 1991 Brochure: Multilift hooklift HL-26, HL-32.

Stellar Industries Inc., Garner, Iowa, Specification Writer's Handbook, "Hook Lift Loaders for Trucks," Ki;u 1996.

\* cited by examiner

SYSTEM FOR LOADING/UNLOADING CONTAINERS

RELATED APPLICATIONS

This application is a continuation of U.S. Ser. No. 10/767,594, filed Jan. 28, 2004 now abandoned.

FIELD OF THE INVENTION

This invention relates to a container handling system for a vehicle, more specifically it relates to a system for loading and unloading large containers from wheeled vehicles.

BACKGROUND OF THE INVENTION

The art typically refers to systems for loading and unloading containers as "hook lifts." These systems have been extensively employed for the transport of various materials within the container. In the usual case, the container may be loaded or unloaded upon the bed of the truck or vehicle utilizing the hook lift system. One very typical and frequent use for such systems is in the picking up and hauling of refuse. An open top or closed top container may be delivered to a point of use and the hook lift used to deploy the container, which contains a lift bar, A-frame or other similar connection to engage the hook, on the terrain underlying the truck where it is left to be filled with refuse or the like. When the container is full, the truck returns to the point where the container has been deposited and through the use of the hook lift system, elevates the filled container onto the truck where it may be transported, along with its contents, to a location where the container is unloaded and emptied, like a landfill or other facility. Examples of hook lift systems are found in U.S. Pat. Nos. 6,558,104; 5,601,393; 4,350,469; 3,874,537; 3,964,625; and 4,204,793.

In addition to hook lifts, the art is familiar with cable hoist systems which accomplish the same loading and unloading function of the hook lift systems but use a cable winch system as described in U.S. Pat. No. 5,460,473. In this type of a system two hydraulic cylinders are typically used to move the cable about a fixed sheave attached to the front end of the vehicle hoist frame. In the fully retracted position the cable, which is wrapped around sheaves connected to the cylinders, is at its longest affective length and can be connected to the front end of a container located on the ground. As the cylinders extend, the effective length of the cable continuously shortens as it wraps around each of the two cylinder sheaves and then finally around the sheave attached at the front end of the hoist frame. As the effective length of the cable gets shorter, the container is pulled up and onto the vehicle, which is usually in a tilted position to facilitate loading and unloading of the container. Another more limited and specific type of lift mechanism is found in U.S. Pat. No. 3,130,847 that uses a bail device mounted on a reciprocating carriage assembly. The bail engages a plurality of specifically designed hook bars located and space along the underneath portion of the container. As the carriage is reciprocated back and forth along a short path at the back end of the hoist frame the successive reciprocation causes the bail to engage the next hook bars and causing the container to move forward a short distance. The reciprocation of carriage eventually pulls the container onto the hoist frame in a slow stepwise fashion. One major problem with all these existing systems for loading and unloading containers is that they each contain only one type of mechanism to pick-up a specific type of container. For example, in the case of the hook lift it can only pick up containers designed specifically to accept the hook and likewise, the cable winch system can only pick up containers designed for cable based systems. Thus, companies must at a minimum maintain and operate two types of vehicles, those with hook lifts and those with cable winches. A need therefore exists for a universal type of loading and unloading System that can load, transport, and unload all types of containers, including, but not limited to those containers specifically designed for conventional cable hoists or hook lifts. In other words, there is a need for a system that has both a hook lift and a cable winch that can be used interchangeably depending on the many various designs of containers or other structures that require loading, transportation and unloading.

My invention solves this problem by using a sliding carriage design that transverses the entire length of an elongated body to allow all types of container and structure designs to be loaded, transported on a wheeled vehicle and unloaded.

SUMMARY OF THE INVENTION

It is the principle object of my invention to provide an improved system for loading and unloading containers and/or structures regardless of the design of container and/or structure, more specifically whether or not a container is designed as a hook lift or cable winch container.

Another object of my invention is to provide a system for attachment to a wheeled vehicle that allows an operator of the vehicle to service any type of container/structure without mechanical modification of the system prior to servicing the particular container/structure design.

One particular embodiment of my invention includes an elongated body that is attached to the wheeled vehicle's frame. The elongated body has a carriage that can slide the length of the body and is driven by a central hydraulic cylinder, such that when the cylinder is fully extended the carriage is positioned near the front end of the elongated body. By "front" or "front end" I mean generally a position that is towards the front or closest to the cab and engine of the vehicle, i.e. a position that is more towards the front than the middle. Likewise, when the cylinder is fully retracted the carriage is positioned at the rear or opposite end of the elongated body. Again, by "rear" or "rear end" I mean generally a position more towards the back end of the wheeled vehicle, i.e. more towards the back than the middle. This would require that one end of the central cylinder to be fixed at the rear end of the elongated body with the other end fixed to the carriage. The end of this cylinder that is fixed to the carriage can be the piston or rod end of the cylinder. Alternatively, the central cylinder could have one end fixed to the front end of the elongated body and the other end to the carriage. In this configuration, when the cylinder is fully retracted the carriage is positioned at the front of the elongated body.

The elongated body is pivotally connected to the vehicle frame near the rear end of the frame. One or more hydraulic cylinders is pivotally attached to a support member located on the front portion of the vehicle frame and to the elongated body near the front end such that when the cylinder is fully retracted the elongated body is in a horizontal position parallel to and adjacent to the vehicle frame. When this cylinder begins to extend the front end of the elongated body moves upward in an arcuate path while the rear most end of the body moves downward. The pivot point being the connection between the vehicle frame and the elongated body located in the rear portion of the body. Raising the front end of the body while lowering the rear end facilitates loading and unloading the container. The body also contains a number of rollers or other friction reducing surfaces positioned along the length of the body which also makes loading and unloading easier by reducing the friction between the container bottom and the body.

As mentioned, the carriage is slidably connected to the elongated body and can move along the body from front to rear along a track using bearing shoes or other friction reducing mechanism, such as rollers. The carriage contains the means or mechanism that connects to the container allowing the container to be pulled up and onto the elongated body. This mechanism may be a cable and sheave combination or a jib and hook device or a combination of both. If the carriage contains the jib and hook device, it will also contain at least one hydraulic cylinder that is capable of moving the jib and hook device through an arcuate path such that when the elongated body is in an elevated position the hook can engage an A-frame on a container, a ring, a trunion, lift bar, or other similar connector on the container. This will be more fully understood with reference to the figures and the description of a preferred embodiment described below.

Once the hook has captured or engaged the container, the cylinder(s) are extended to move the jib and hook device to its original starting point. Alternatively, depending on the orientation of these cylinders, they can be retracted to move the jib and hook device to its original starting point. The central hydraulic cylinder connected to the carriage is then operated (either retracting or extending depending on the configuration) to move the carriage from the rear of the elongated body to the front end and in so doing pulling the container along with it until the container is fully positioned on the elongated body. The cylinder(s) that elevated the elongated body is then retracted lowering the front portion of the body until it is in a horizontal or starting position parallel to the frame of the vehicle. However, it is within the scope of my invention that each of the hydraulic cylinders can be operated simultaneously. In other words, the elongated body can be moved at the same time as the sliding carriage and the hook and jib mechanism.

When the cable and sheave combination is used on the carriage, one end of the cable is fixedly attached preferably to the rear end of the elongated body. Alternatively, the fixed end of the cable can be attached to a cross member on the elongated body located in the rear portion of the body, or attached to the central cylinder in the rear portion of the body. The other free end of the cable is passed around a sheave that is fixed to the carriage. When the carriage is positioned at the rear of the elongated body, the free end of the cable is of sufficient length that it can be attached to a container designed to be used with a traditional cable winch system. The free end of the cable may contain a hook, latch, clasp or other suitable device to allow it to be removably connected to the container. Once the cable is connected to the container, the vehicle operator operates the central hydraulic cylinder causing the carriage to move to the front end of the elongated body. As the carriage moves forward so does the cable sheave which in turn reduces the length of the free end of the cable and thus pulls the container onto the elongated body. Because the cable is attached to the rear end of the body and is of a fixed length, when the carriage reaches the front of the elongated body the container is necessarily pulled all the way onto the body. Once the carriage is positioned to the front of the body and the container is fully on the body, then the cylinder(s) that lift the body is retracted, lowering the body and container to a horizontal or starting position. Again, there is no requirement that each cylinder or set of cylinders be operated in serial fashion and it is well within the scope of my invention that the cylinders may be operated simultaneously. When loading and unloading containers with the cable and sheave combination it is preferably, but not necessary, that the jib and hook remain in the upright and stowed position. Further details of the components and operation of the system will be evident from the following description of a preferred embodiment.

DETAILED DESCRIPTION OF PREFERRED EMBODIMENTS

Figure 1:
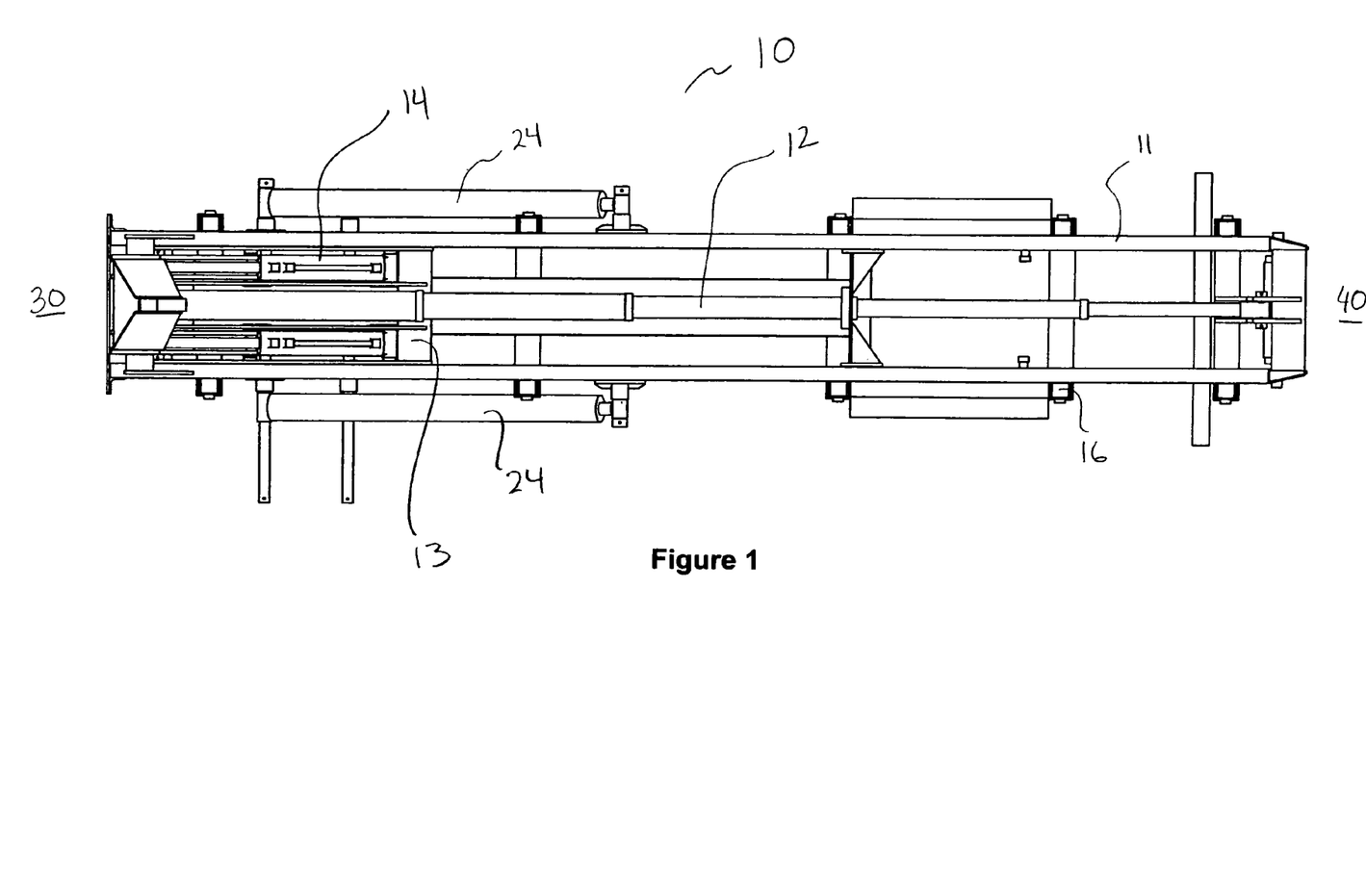
FIG. 1 is a top view of the loading and unloading system of my invention.
Figure 2:
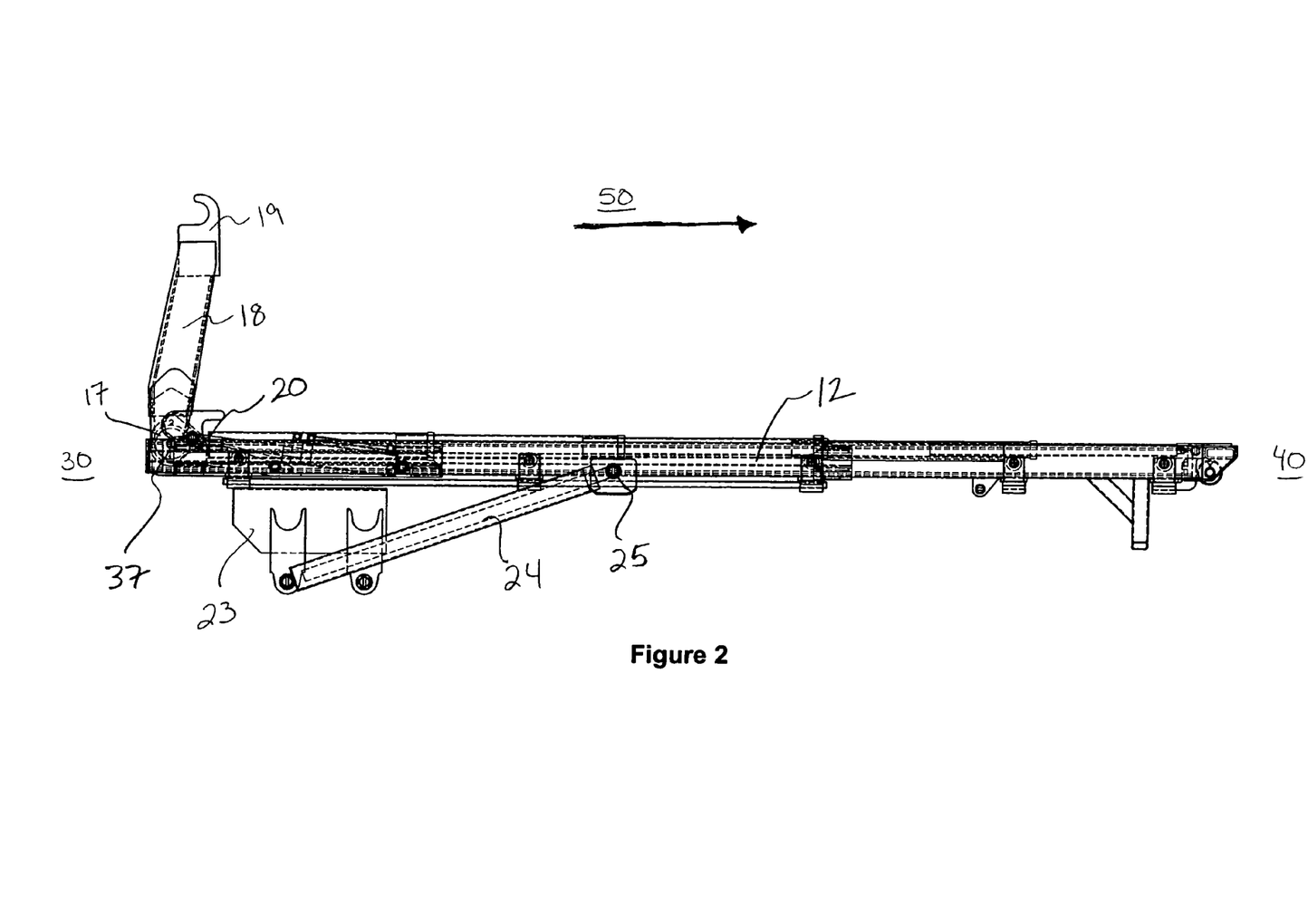
FIG. 2 is a side view of the system of my invention with the carriage in the forward position.
Figure 3:
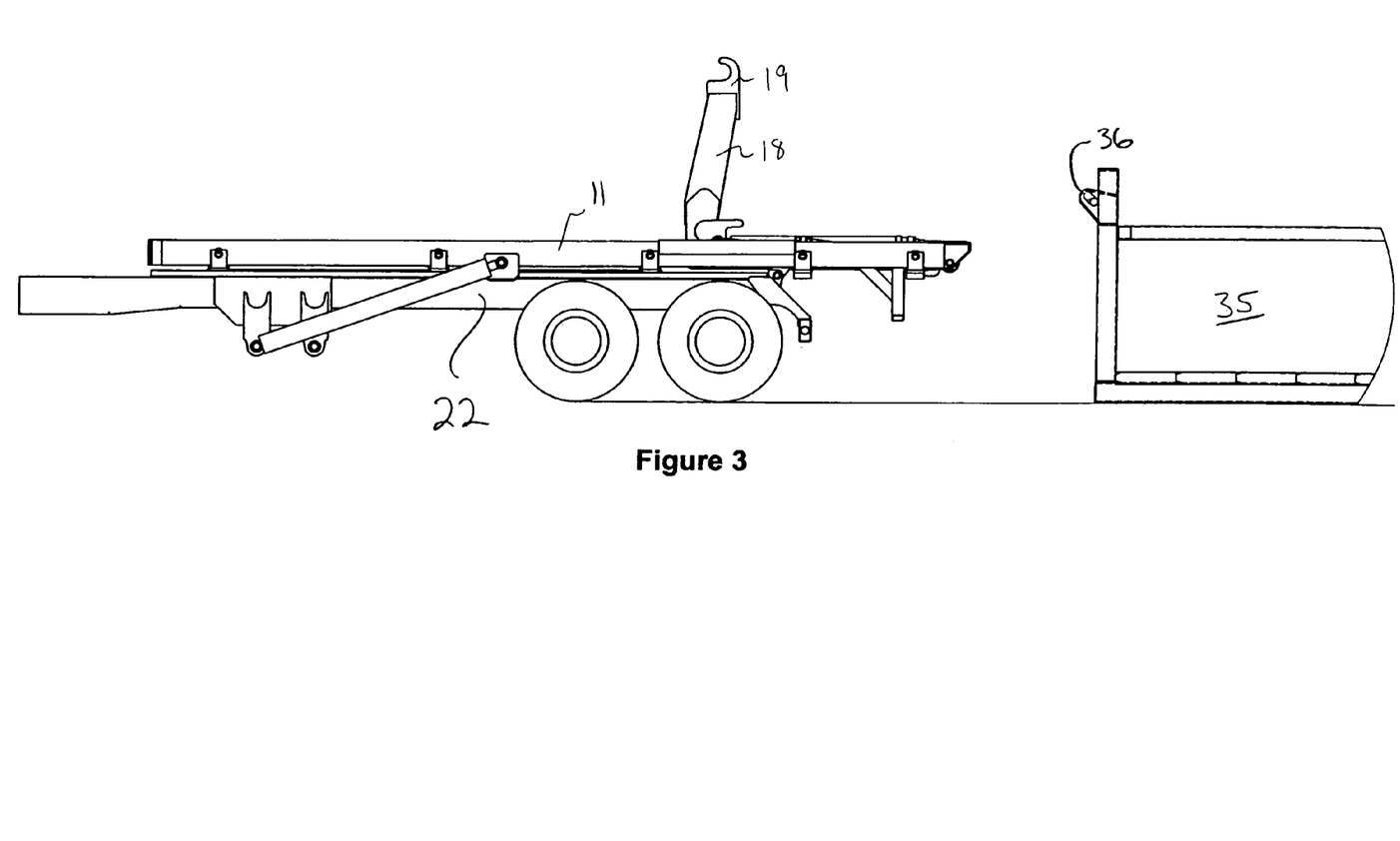
FIG. 3 is a side view of my invention connected to a wheeled vehicle where the slidable carriage in the rear position.

Illustrated in FIGS. 1 through 11 are top, side and perspective views, respectively, of system 10 of my invention shown alone and as removably attached to a wheeled vehicle frame 22. The system of my invention includes, among other items, elongated body 11 with carriage 13 slidably connected thereto. Carriage 13 may contain one or more mechanisms that are capable of connecting to a container for loading and unloading purposes. Carriage 13 slides along the entire length of elongated body 11 using bearing shoes 15 and is moved by action of a central hydraulic cylinder 12, which preferably is a multi-stage cylinder. As explained, central cylinder 12 is fixed at one end to carriage 13 and at the other end to elongated body 11. As cylinder 12 retracts, carriage 13 moves in direction 50 toward the rear 40 of the body. At the fully retracted position of cylinder 12, carriage 13 is at the rear end 40 of body 11 as illustrated in FIG. 3.

Figure 4:
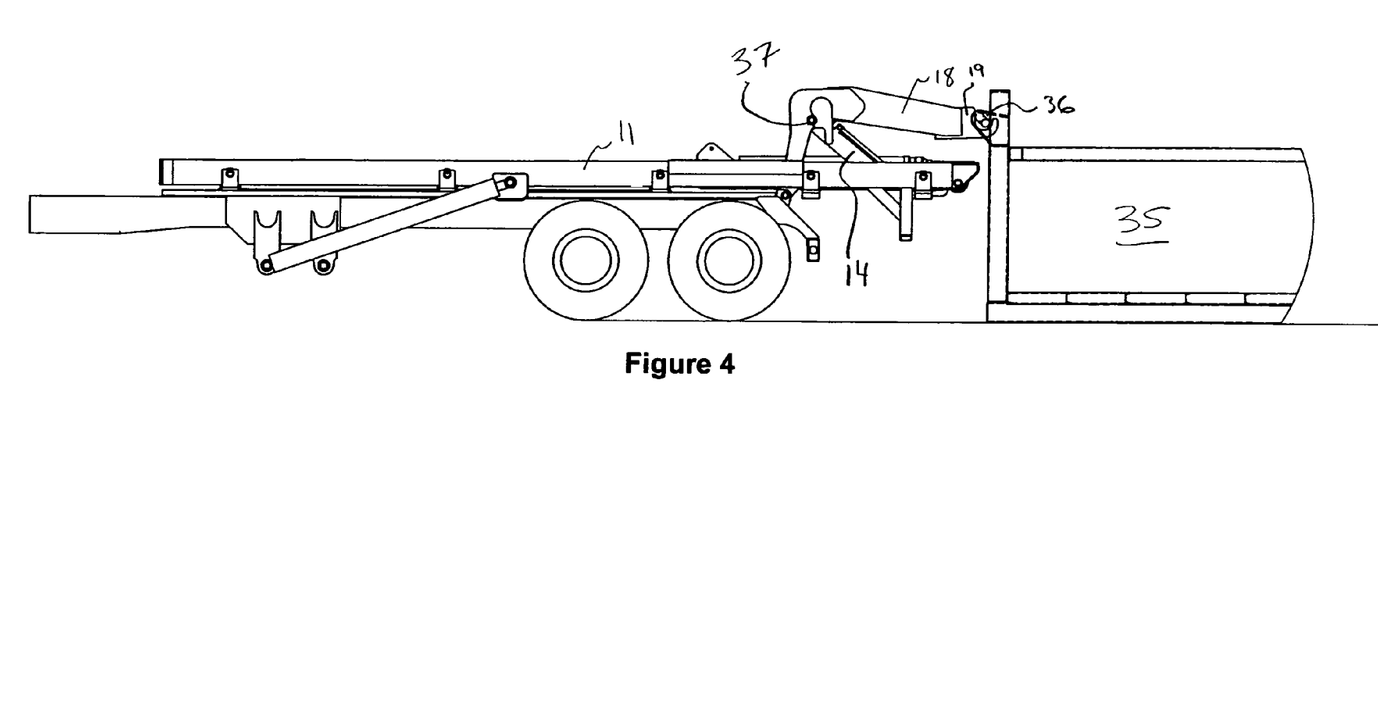
FIG. 4 is a side view of my invention connected to a wheeled vehicle where the jib and hook device is connected to a container.
Figure 10:
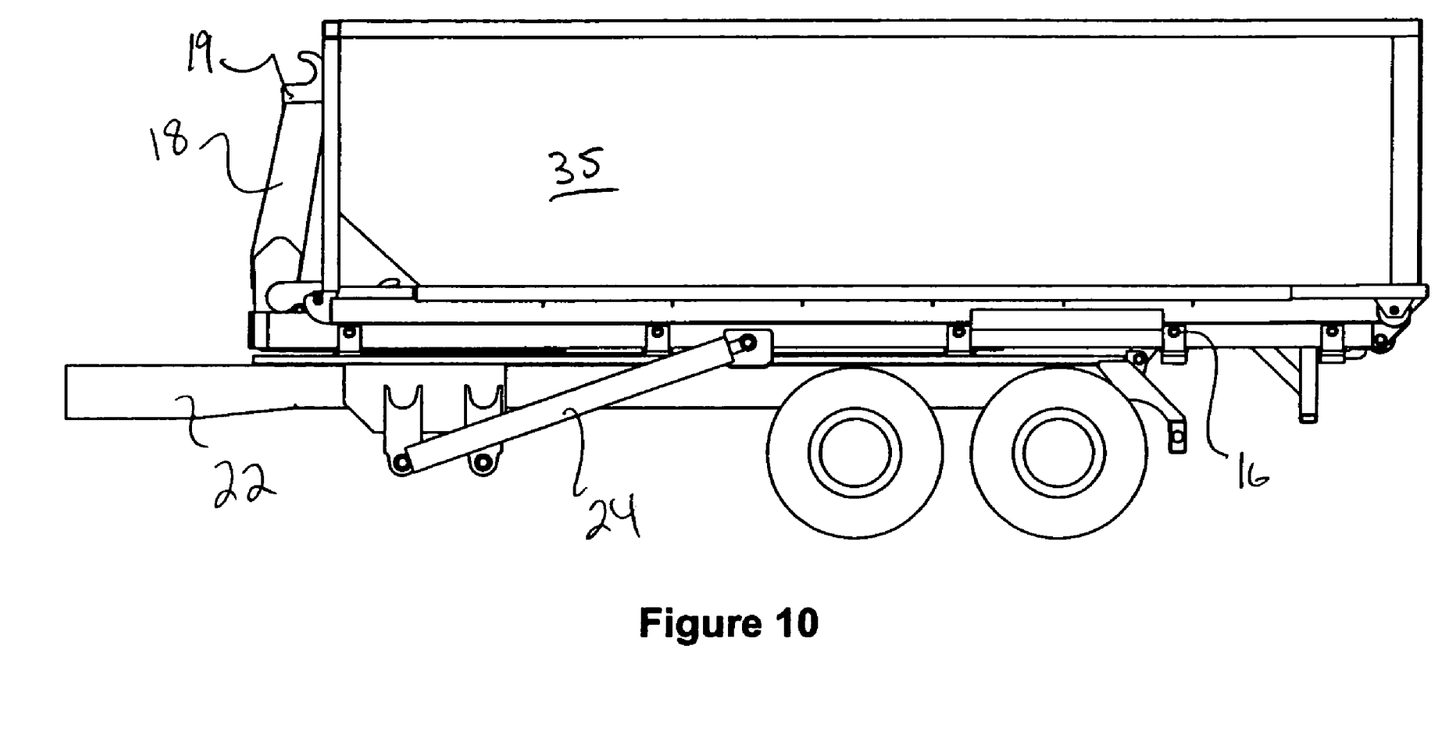
FIG. 10 is a side view of my invention using the cable and sheave combination and showing a container fully loaded and with the carriage at the front position.
Figure 11:
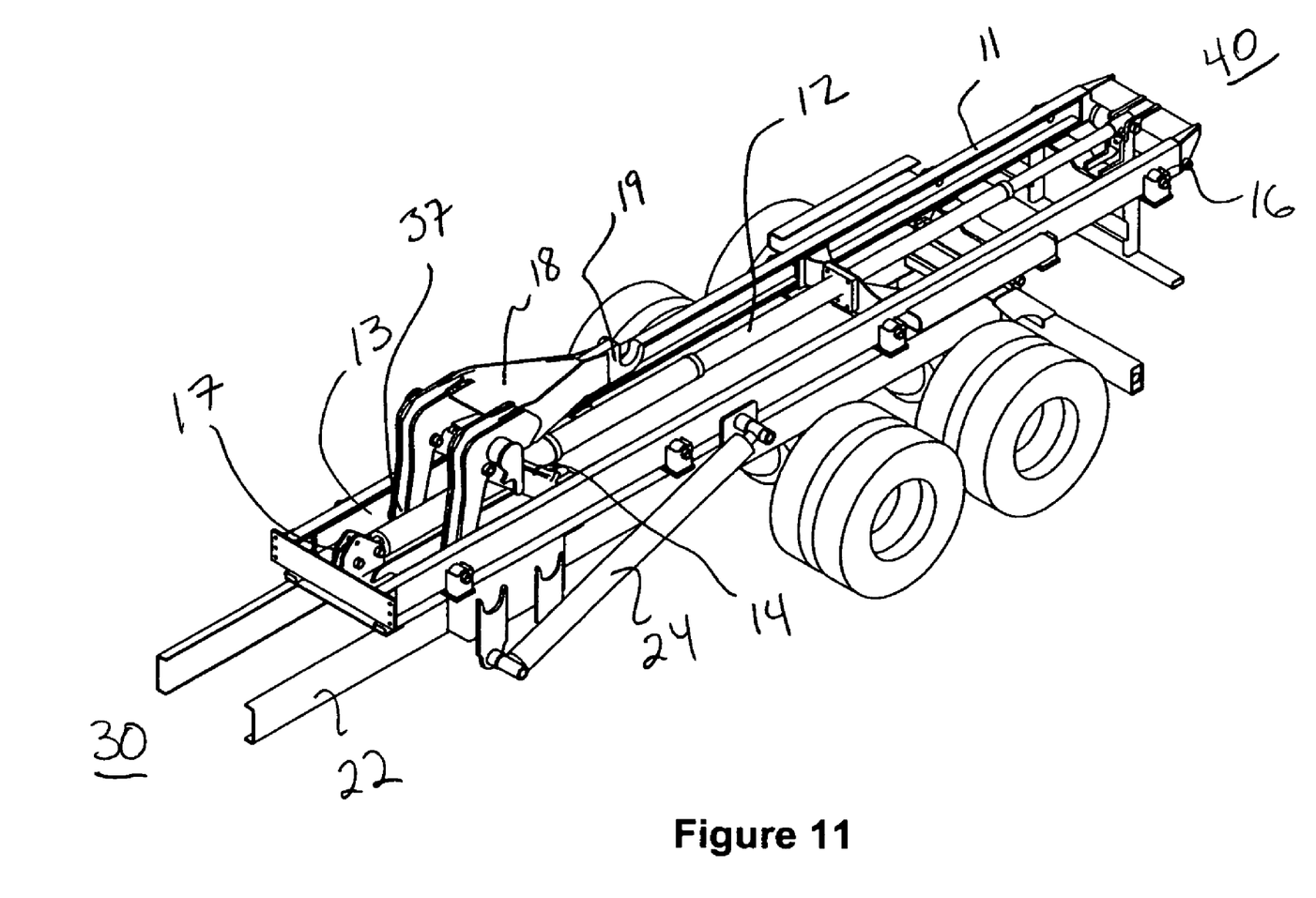
FIG. 11 is a perspective view of my invention showing the slidable carriage containing the jib and hook device and the central cylinder.
Figure 12:
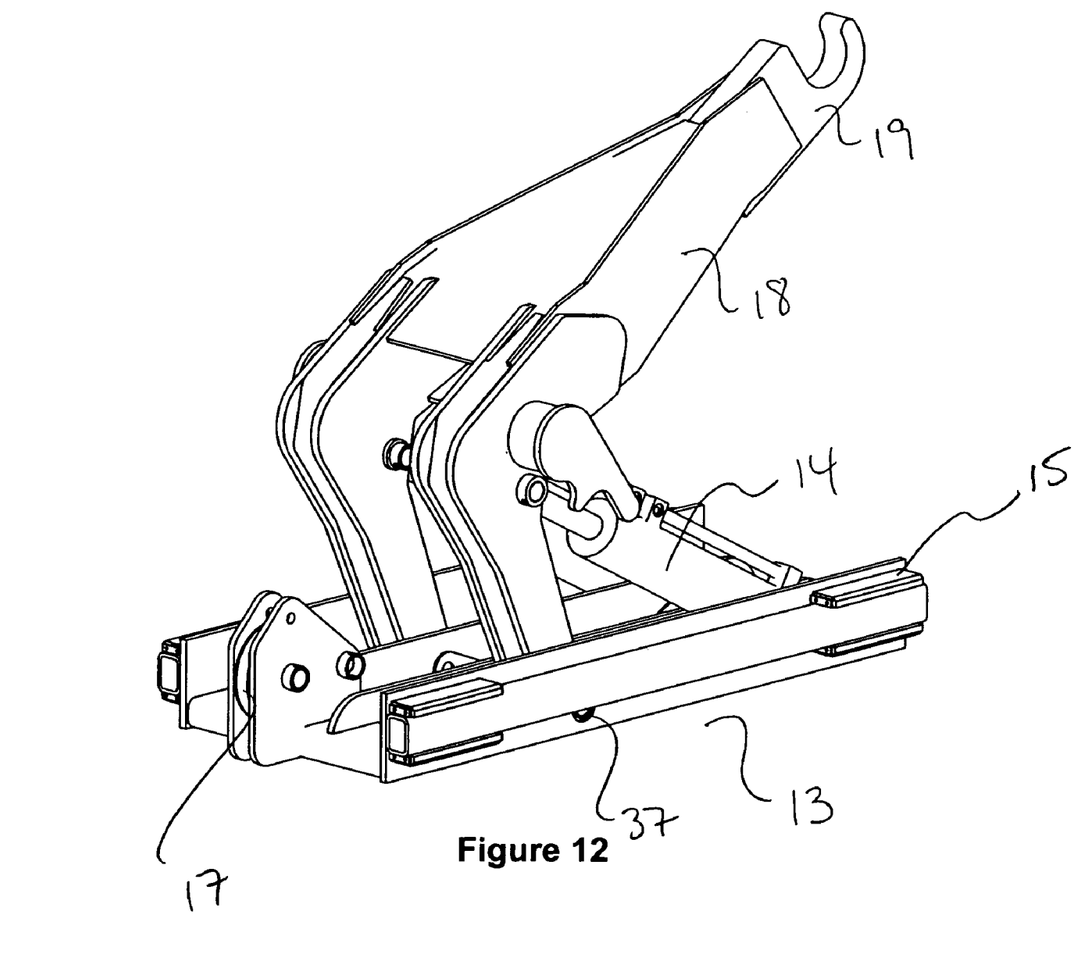
FIG. 12 is a perspective view of the slidable carriage of my invention.

Once carriage 13 is positioned at the rear of the body the operator can use either the jib 18 and hook 19 device or cable 20 and sheave 17 combination to engage container 35. The particular engaging mechanism will depend on the specific design of the container. If the container has a lift bar 36 and is designed to be engaged by a hook lift type mechanism, then cylinders 14 on carriage 13 will be activated to raise jib 18 about pivot point 37 as shown in FIG. 4. In the raised position hook 19 can then engage lift bar 36 on container 35. Container 35 can be elevated and lifted onto elongated body 11 in at least two ways. The first is where cylinders 14 on carriage 13 are retracted which causes container 35 to be lifted up and onto the rear end 40 of body 11. Once cylinders 14 are fully retracted and jib 18 is returned to the starting position, the container will be up on the end of body 11. Carriage 13 is then moved toward front end 30 of the body by extending cylinder 12. This will cause container 35 to move toward the front end of body 11 via travel on rollers 16 or other type of friction reducing mechanism or bearing surface. When carriage 13 reaches the front end of body 11 the container will be fully loaded as shown in FIG. 10.

Figure 5:
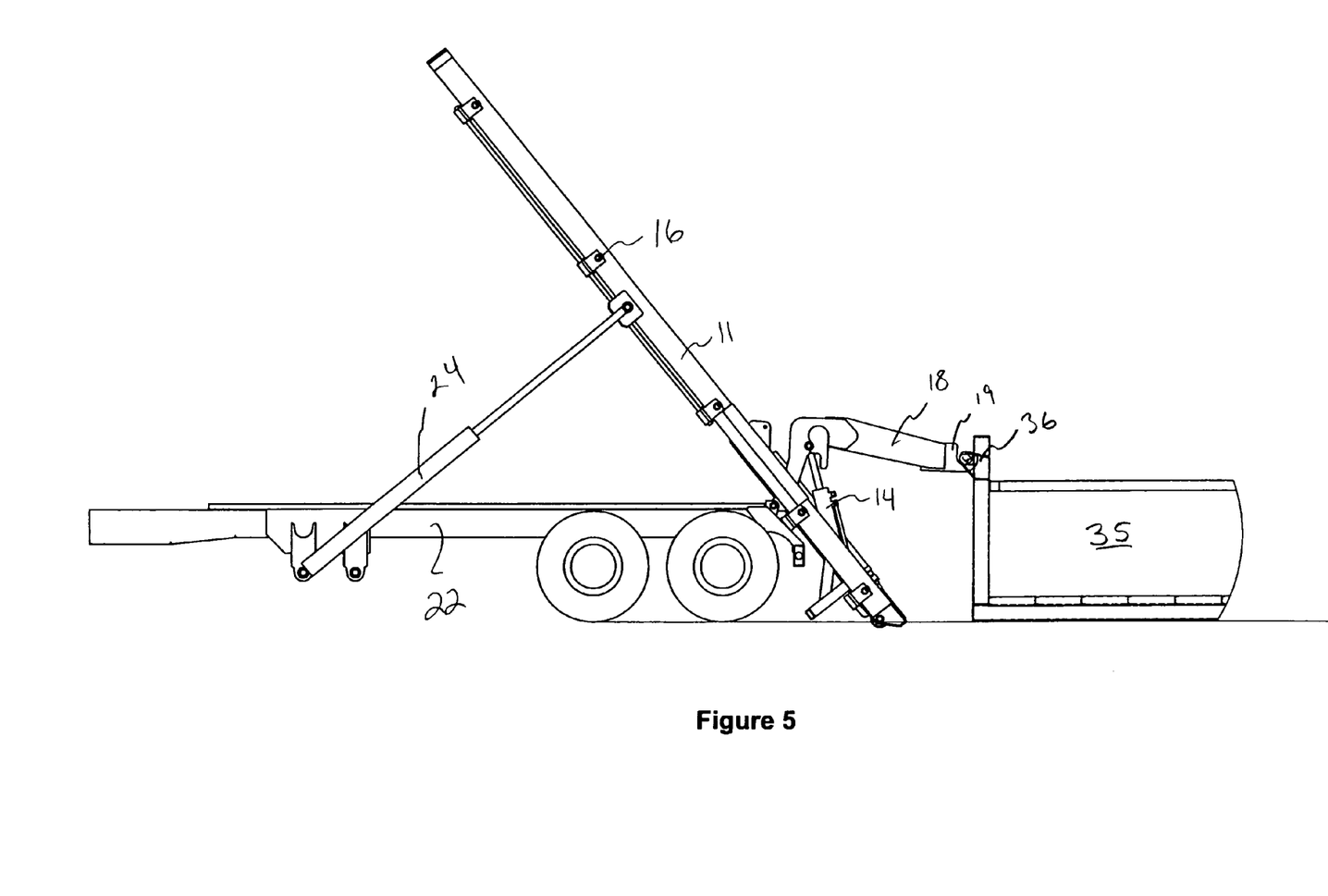
FIG. 5 is a side view of my invention using the jib and hook device and with the elongated body elevated at the front end to facilitate loading of the container.
Figure 6:
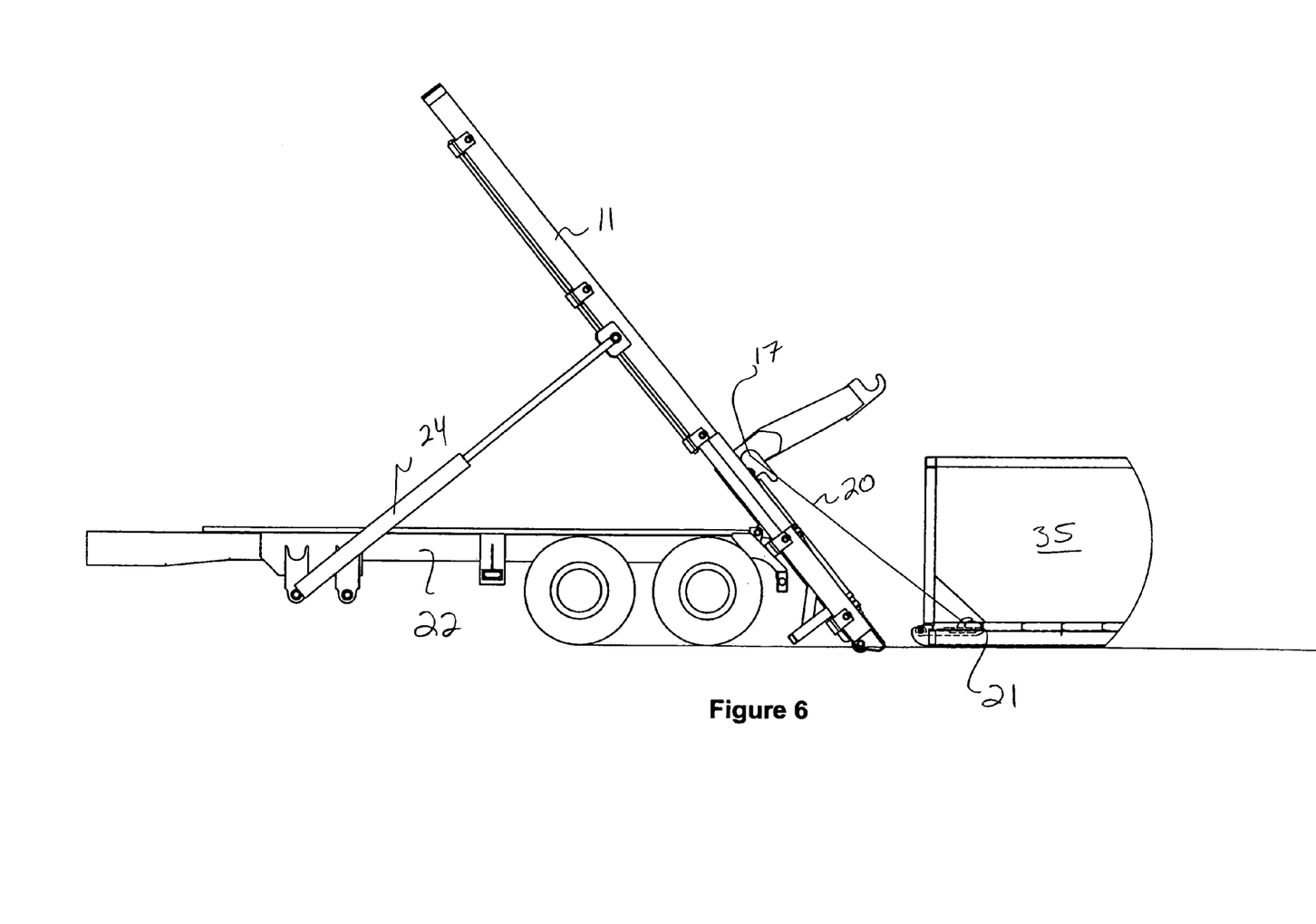
FIG. 6 is a side view of my invention with the elongated body elevated using the cable and sheave combination to load a container.
Figure 7:
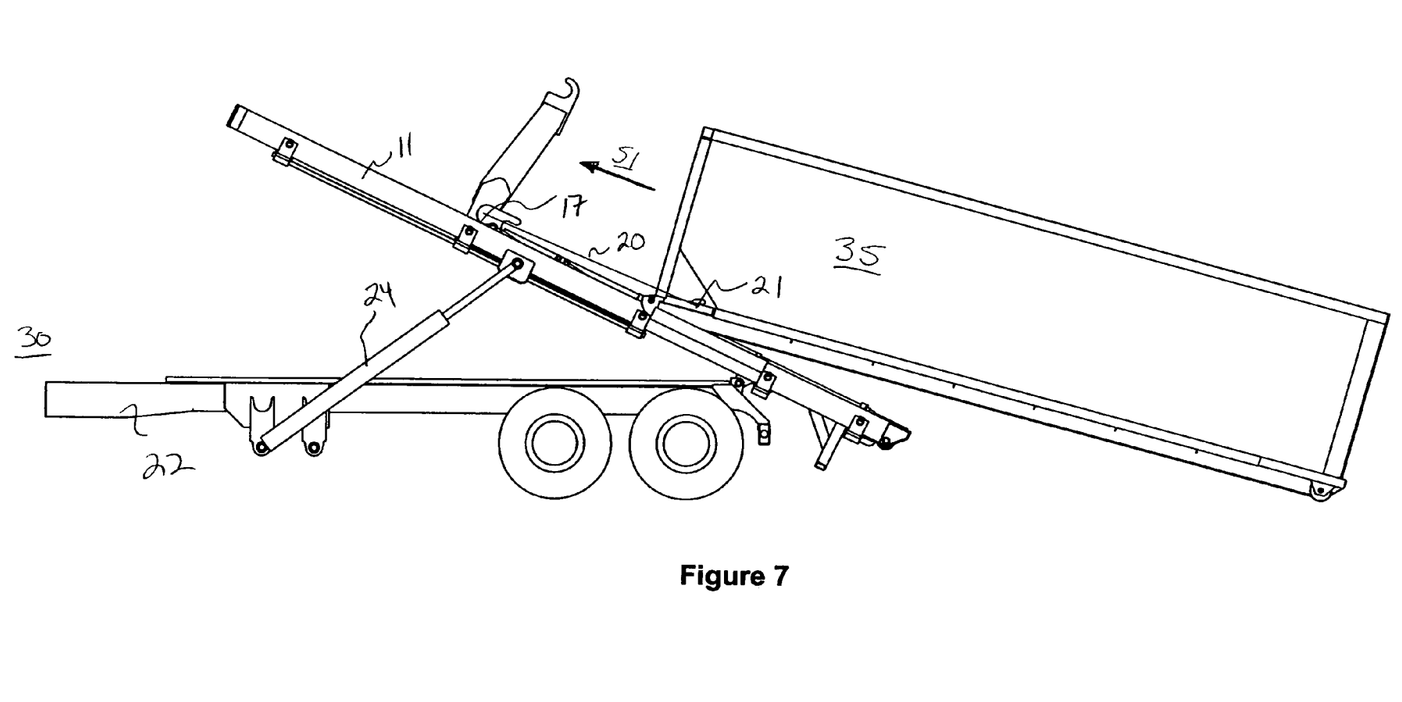
FIG. 7 is a side view of my invention showing the cable and sheave combination loading a container onto a partially elevated elongated body.
Figure 8:
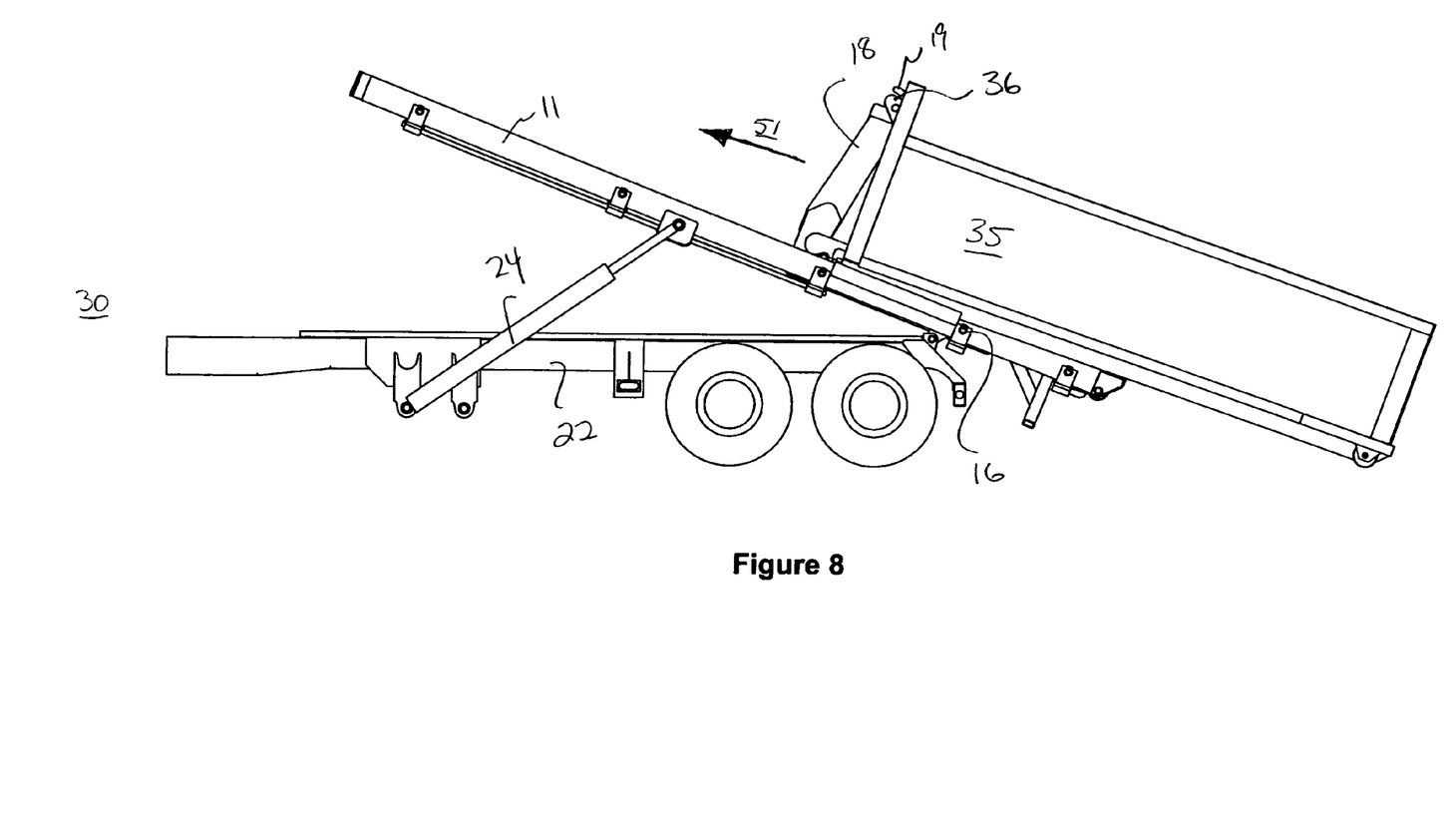
FIG. 8 is a side view of my invention showing the hook and jib device being used to load a container onto a partially elevated elongated body.
Figure 9:
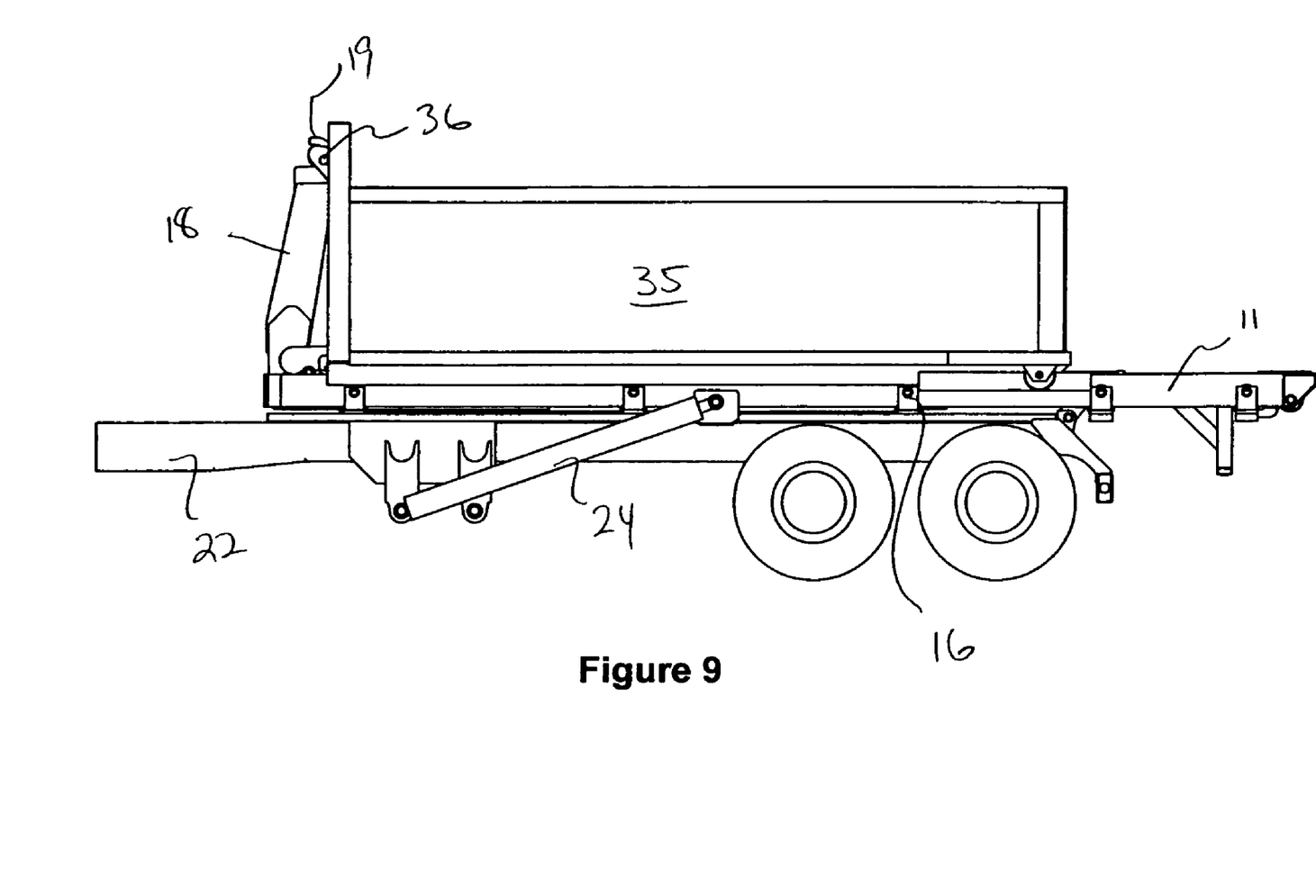
FIG. 9 is a side view of my invention using the jib and hook device showing a container fully loaded and with the carriage at the front position.

Alternatively, the container can be loaded by tilting body 11 as shown in FIGS. 5 and 6. Tilting body 11 is accomplished by extending hydraulic cylinder 24, which typically has a companion cylinder located on the opposite side of the vehicle frame 22. Hook 19 can engage lift bar 36 either before or after body 11 is tilted. As shown in FIG. 6, if container 35 is of the type requiring loading by a cable mechanism, cable 20 and engaging mechanism 21 is attached to container 35 while body 11 is in the tilted position. Once the cable (or hook) is attached to container 35, carriage 13 is moved by central cylinder 12 as shown in FIGS. 7 and 8 in direction 51 towards front end 30. As carriage 13 moves towards front end 30, cable 20 is pulled around sheave 17 such that the distance between container 35 and jib 18 continuously decreases until the container and the jib are adjacent to each as shown in FIG. 10. At this point the container is fully loaded onto body 11. If the carriage was moved forward while body 11 was in a tilted position, then cylinder 24 would then be retracted to bring body 11 and container 35 to a horizontal position parallel with vehicle frame 22 as shown in FIG. 9.

Although the invention has been described with respect to preferred embodiments, it is to be also understood that it is not to be so limited since changes and modifications can be made therein which are within the full scope of this invention as detailed by the following claims.

I claim:

1. A system for loading or unloading a container or other structure from a transport vehicle comprising, in combination,
    (a) an elongated body removably attached to a transport vehicle, where the elongated body comprises a track having an upper edge and has a length that is defined by a front end located adjacent to a transport vehicle cab and a rear end located opposite the front end;
    (b) a multi-stage central hydraulic cylinder having a fixed end and a moving end, where the fixed end is attached to the rear end of the elongated body and the moving end is attached directly to a carriage such that extending and retracting the central hydraulic cylinder moves the carriage from the rear of the elongated body to the front of the elongated body without using cables, wires, chains, or pulleys, where the carriage is slidably attached to the track of the elongated body and is adapted to transfer or distribute loads as it travels from the rear end to the front end of the elongated body during loading of a container or other structure onto the transport vehicle and where the carriage has mounted thereon a combination of,
    first engaging mechanism comprising a L-shaped jib terminating with an integral hook connected to a first pair of hydraulic cylinders configured to raise and lower the jib about a pivot point, the jib having an unpivoted position wherein the first pair of hydraulic cylinders are horizontally located below a plane defined by the upper edge of the track and a pivoted position wherein the hydraulic cylinders protrude above the plane defined by the upper edge of the track;
    a second engaging mechanism comprising a cable sheave and cable combination, where the cable slidably engages the cable sheave that is mounted on the carriage, where a fixed end of the cable is attached directly to the elongated body and a free end is configured to releasably engage the container or other structure such that as the carriage moves towards the front end of the elongated body the cable is pulled around the cable sheave and pulls a connected container or other structure in the same direction as the carriage;
    where the first and second engaging mechanisms are adapted to releasably engage a container or other structure and are connected to and move with the carriage along the entire length of the elongated body when the central hydraulic cylinder is extended or retracted, where extension of the central hydraulic cylinder moves the carriage to the front end of the elongated body and necessarily causes the container or other structure attached to one of the first or second engaging mechanism to be loaded onto the elongated body and retraction of the central hydraulic cylinder accomplishes rearward movement of the container or other structure; and
    (c) a second pair of hydraulic cylinders connected to the transport vehicle and to the elongated body and oriented such that when the pair of cylinders are extended the front end of elongated body is lifted to a position above the rear end of the elongated body.

2. A system for loading or unloading a container or other structure from a transport vehicle comprising, in combination,
    (a) an elongated body removably attached to a transport vehicle, where the elongated body comprises a track having an upper edge and has a length that is defined by a front end located adjacent to a transport vehicle cab and a rear end located opposite the front end;
    (b) a multi-stage central hydraulic cylinder having a fixed end and a moving end and having an integral mid-support member configured to move along the track as the cylinder is retracted and collapsed, where the fixed end is attached to the rear end of the elongated body and the moving end is attached directly to a carriage such that extending and retracting the central hydraulic cylinder moves the carriage from the rear of the elongated body to the front of the elongated body without using cables, wires, chains, or pulleys, where the carriage is slidably attached to the track of the elongated body and is adapted to transfer or distribute loads as it travels from the rear end to the front end of the elongated body during loading of a container or other structure onto the transport vehicle and where the carriage has mounted thereon a combination of, a first engaging mechanism comprising a L-shaped jib terminating with an integral hook connected to a first pair of hydraulic cylinders configured to raise and lower the jib about a pivot point, the jib having an unpivoted position wherein the first pair of hydraulic cylinders are horizontally located below a plane defined by the upper edge of the track and a pivoted position wherein the hydraulic cylinders protrude above the plane defined by the upper edge of the track;
    a second engaging mechanism comprising a cable sheave and cable combinations, where the cable slidably engages the cable sheave that is mounted on the carriage, where a fixed end of the cable is attached directly to the elongated body and a free end is configured to releasably engage the container or other structure such that as the carriage moves towards the front end of the elongated body the cable is pulled around the cable sheave and pulls a connected container or other structure in the same direction as the carriage, a third engaging mechanism comprising a bearing surface on the jib adapted to contact the container when the carriage is moved towards the rear end of the elongated body, wherein said third engaging mechanism can be used to move the container or other structure substantially along the length of the elongated body;

where the first and second engaging mechanisms are adapted to releasably engage a container or other structure and are connected to and move with the carriage along the entire length of the elongated body when the central hydraulic cylinder is extended or retracted, where extension of the central hydraulic cylinder moves the carriage to the front end of the elongated body and necessarily causes the container or other structure attached to one of the first or second engaging mechanism to be loaded onto the elongated body and retraction of the central hydraulic cylinder accomplishes rearward movement of the container when the bearing surface contacts the container; and (c) a second pair of hydraulic cylinders connected to the transport vehicle and to the elongated body and oriented such that when the pair of cylinders are extended the front end of elongated body is lifted to a position above the rear end of the elongated body.

* * * * *